Sept. 24, 1929.      G. H. FLETCHER ET AL      1,729,437
ELECTRICALLY DRIVEN VEHICLE
Filed Feb. 27, 1928       3 Sheets-Sheet 1

INVENTOR
George H. Fletcher
and Arnold Tustin.
BY
Wesley G. Carr
ATTORNEY

INVENTOR
George H. Fletcher
and Arnold Tustin.
BY
Wesley G. Carr
ATTORNEY

Sept. 24, 1929.   G. H. FLETCHER ET AL   1,729,437
ELECTRICALLY DRIVEN VEHICLE
Filed Feb. 27, 1928   3 Sheets-Sheet 3

INVENTOR
George H. Fletcher
and Arnold Tustin.
BY
Wesley G. Carr
ATTORNEY

Patented Sept. 24, 1929

1,729,437

UNITED STATES PATENT OFFICE

GEORGE HERBERT FLETCHER AND ARNOLD TUSTIN, OF SHEFFIELD, ENGLAND, ASSIGNORS TO WESTINGHOUSE ELECTRIC AND MANUFACTURING COMPANY, A CORPORATION OF PENNSYLVANIA

ELECTRICALLY-DRIVEN VEHICLE

Application filed February 27, 1928, Serial No. 257,225, and in Great Britain February 28, 1927.

The invention relates generally to electrically driven vehicles and more particularly to an improved mechanism for transmitting power from the propelling motor to the drive wheels of the vehicle.

Heretofore difficulty has been experienced in providing simple and efficient mechanism for driving the track wheels of electric locomotives, street railway vehicles and other electrically driven vehicles.

In general it is desirable that the drive mechanisms of electrically driven vehicles be constructed in such a manner that a large portion of the weight of the driving mechanism may be supported upon the frame of the vehicle which, in turn, may be resiliently supported upon the driven wheel axle. In such manner the weight of the driving mechanism is largely spring supported and the amount of weight which is rigidly carried by the wheels is reduced to a minimum.

In the present invention, the motor is disposed to drive a hollow shaft, generally known as a quill shaft, through a worm and worm wheel gear, the bearings for both the hollow shaft and the motor spindle being carried by the motor frame. The wheel axle to be driven passes through the hollow shaft and is operatively connected to it by means of a universal coupling device which allows limited universal movement of the wheel axle with respect to the hollow shaft.

Therefore, it will be understood that the motor structure, together with the driving gear mechanism, the quill shaft and a portion of the coupling means may be entirely carried by the spring supported frame of the vehicle. The only portions of the vehicle which constitute unsprung weight are the driving wheels, the axle and that portion of the coupling which is carried by the axle, the weight of the coupling being substantially negligible.

It is, therefore, an object of the invention to provide a drive mechanism for electrically driven vehicles in which the weight of the driving motor and a large portion of the weight of the transmission mechanism is carried by a spring supported vehicle frame.

Another object of the invention is to provide a vehicle drive mechanism that is relatively compact, light and durable and that is substantially noiseless in operation.

Another object of the invention is to provide a vehicle drive mechanism in which the motor housing and the gear casing for enclosing the transmission mechanism constitute a unitary structure.

A further object of the invention is to provide an improved transmission mechanism for operatively connecting a motor to the driven wheel axle of a vehicle.

Other objects of the invention will become apparent as the following description is studied in connection with the drawing, wherein.

Figure 1:
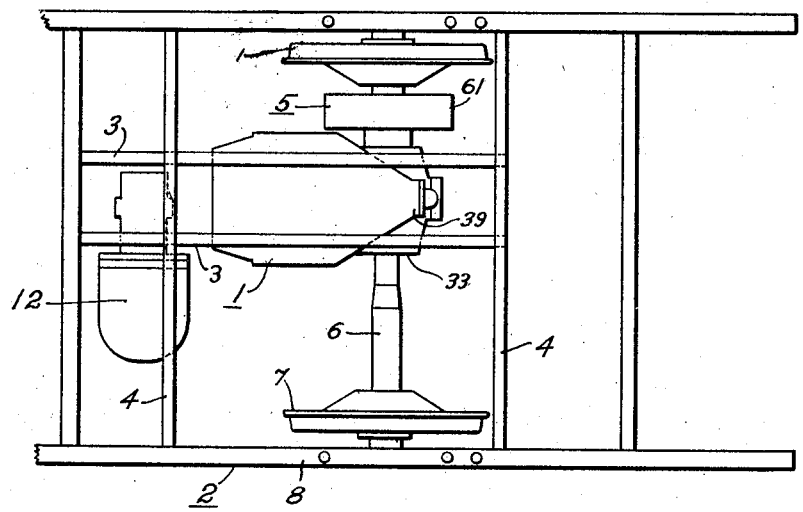
Figure 1 is a plan view of a portion of a vehicle frame upon which is mounted a drive mechanism embodying the principles of the invention.

As shown in Figure 1, a unitary motor housing and transmission mechanism 1 are disposed longitudinally of a vehicle frame 2 and supported therein in any convenient manner such as by transoms 3 that are mounted on frame cross-members 4. Power may be transmitted by means of a universal coupling mechanism 5 from the motor and transmission unit 1 to a wheel axle 6 that is provided with wheels 7 and is resiliently journalled in side frame members 8 of the vehicle frame 2.

Figure 2:
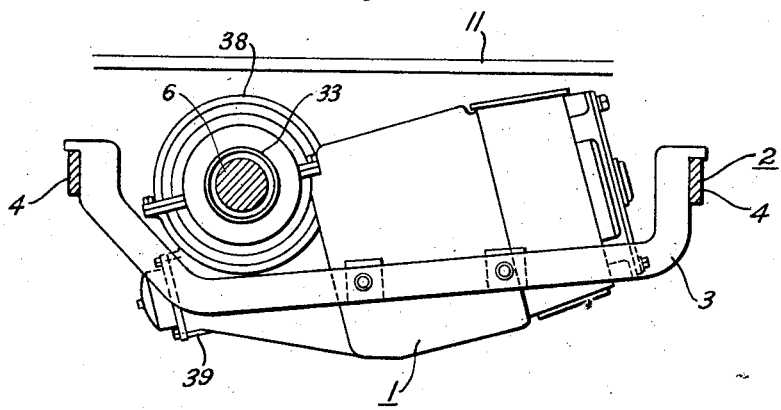
Fig. 2 is a view, partly in section and partly in side elevation, of a portion of a vehicle showing the drive mechanism suspended from the frame.

When it is desirable to place the driving mechanism 1 as low as possible with respect to the vehicle frame 2, it may be suspended in the manner shown in Fig. 2. In this view the driving unit 1 is disposed mainly below the axle 6 and tilted somewhat to bring the top of the casing at the end farthest from the axle close beneath a floor 11 of a vehicle body (not shown) that may be supported upon the vehicle frame 2. Because of the compact arrangement of the vehicle drive mechanism embodying the invention, ample space remains for mounting upon the vehicle frame 2 other mechanism, such for example as a motor driven air compressor 12 and any suitable brake gear, (not shown) as may be desired.

Figure 3:
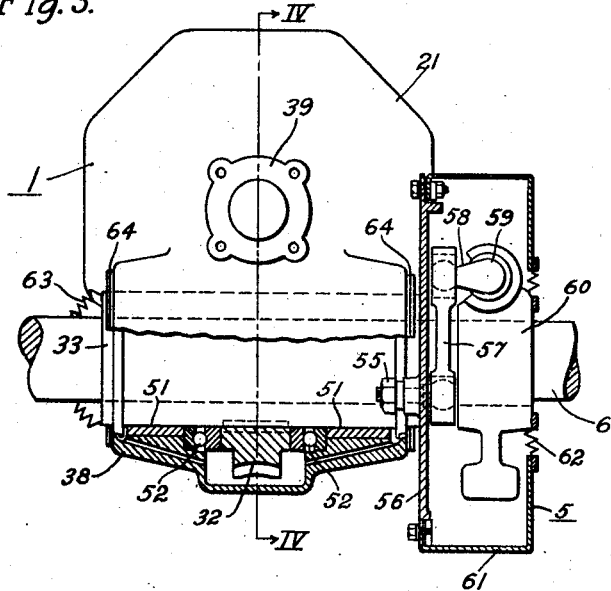
Fig. 3 is a view in end elevation of the drive mechanism, a portion being broken away to show the quill shaft and coupling.
Figure 4:
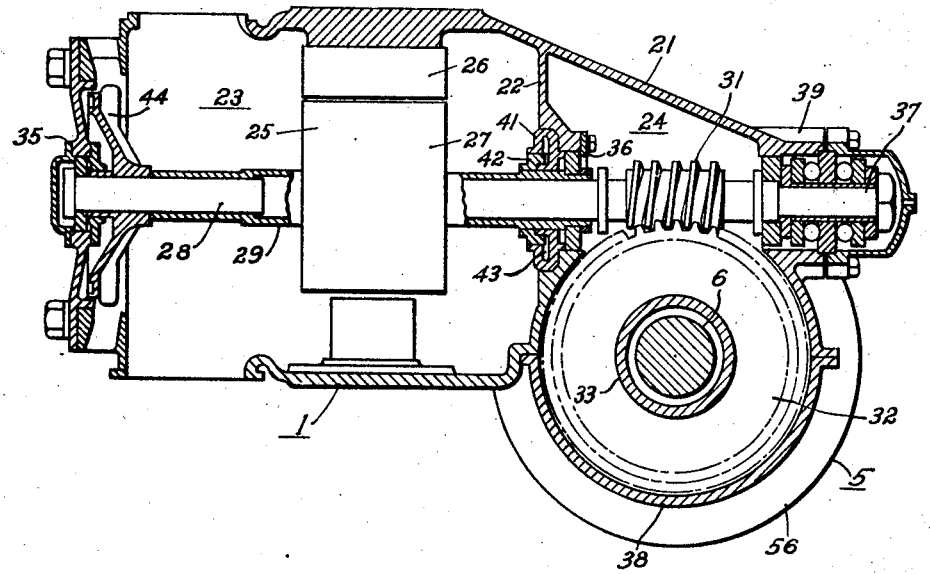
Fig. 4 is a longitudinal sectional view of the combined motor and drive mechanism taken along the line IV—IV of Fig. 3.

Referring to Figs. 3 and 4, the unitary motor and transmission mechanism 1 comprises a casing 21 that is divided by means of a partition 22 into a motor compartment 23 and a transmission mechanism compartment 24. The power for driving the vehicle is furnished by a motor 25 of any suitable design that is mounted within the motor compartment 23. The motor 25 comprises a stator portion 26 that is securely mounted on the inner surface of the casing 21 and a cooperating rotor 27 that is mounted on a sleeve member 29 which is in turn carried by a motor spindle 28 that extends into the compartment 24. The portion of the motor spindle 28 within the housing portion 24 is provided with a worm 31 that is disposed to mesh with a worm wheel 32 which is securely mounted on a hollow shaft or quill 33 that is journalled in the casing 21 in a plane perpendicular to the motor spindle 28.

In order that the spindle 28 and the rotor 27 may be rotatably supported within the housing portion 23, bearings 35 and 36 are provided in the end of the casing 21 and in the partition 22 respectively. To further support the spindle 28 and to absorb the thrust of the worm 31, a relatively large thrust bearing 37 is provided in a constricted portion 39 of the casing 21 for receiving the end of the spindle 28 adjacent the worm 31.

The apertures in the casing 21 which receive the bearings 35, 36 and 37 are made of sufficient size to permit the passage of the worm 31 therethrough in order that the motor spindle 28, together with the rotor 27 and worm 31 may be removed from the casing 21 as a unit. In order that the entire casing 21 may be removed from the quill shaft 33 a lower portion 38 of the casing is made detachable as shown in Fig. 4.

Inasmuch as the compartment 24 constitutes an oil retaining chamber for the transmission mechanism enclosed therein, a gland member 41 is provided in the partition 22 for coacting with a gland member 42 on the motor spindle 28 in order to prevent the passage of oil into the motor compartment 23, such oil as may find its way into the gland being returned to the transmission compartment 24 by means of ducts 43. The return of oil to the compartment 24 is further assisted by means of the air pressure which is created within the compartment 23 by the ventilating fan 44 thereby causing a current of air to oppose the passage of oil or oil vapor through the partition 22.

Referring to Fig. 3, the quill shaft 33 is journalled in bearings 51 that are mounted between the lower portion of the casing 21 that constitutes the compartment 24 and the removable portion 38. The worm wheel 32 is maintained in proper alignment with the worm 31 by means of thrust bearings 52 that are interposed between the worm wheel 32 and the adjacent portions of the casing 21 to absorb endwise thrust that may be exerted either upon the wheel 32 or the quill shaft 33.

The flexible or universal coupling 5 that is utilized to transmit torque from the quill shaft 33 to the wheel axle 6 as shown in Fig. 3 is substantially the same as the coupling shown and described in Patent No. 1,633,935 issued June 28, 1927, to George Herbert Fletcher and Herman Rusby and assigned to the Westinghouse Electric and Manufacturing Company.

In general, this coupling as shown in Fig. 3 comprises a pair of driving pins 55 that are mounted in an end plate 56 which is secured to one end of the quill shaft 33. The torque of the quill shaft 33 is transmitted by means of the driving pins 55 through links 57 to crank members 58 that are mounted on either end of a transversely disposed shaft 59 which is journalled in a collar portion 60 that is, in turn, rigidly secured to the wheel axle 6.

As more fully described in the above mentioned patent specification, this coupling permits relative lateral movement of the quill shaft 33 and the axle 6, as well as a limited degree of relative endwise and tilting movements.

In order to suitably enclose the coupling 5 a casing 61 is secured to the end plate 56 in such manner that it forms a housing that rotates with the quill shaft 33. To provide for relative motion between the casing 61 and the axle 6 and to retain lubricant within the compartment 24, an annulus 62 of flexible material is secured between the edge of the casing 61 and the collar 60. A similar flexible connection 63 is provided between the other end of the quill shaft 33 and the axle 6. To further minimize the escape of oil from the chamber 24, packing rings 64 are provided at each end of the quill shaft 33 where it emerges from the casing portion 21.

When it is desired to inspect the gearing or to remove the casing 21, together with the motor 25, it is only necessary to detach the lower portion 38 of the transmission compartment 24 as hereinbefore explained, whereupon the casing 21, together with the motor 25 and the worm 31 can be removed leaving the worm wheel 32, the quill shaft 33 and the coupling mechanism 5 resting upon the wheel axle 6.

Figure 5:
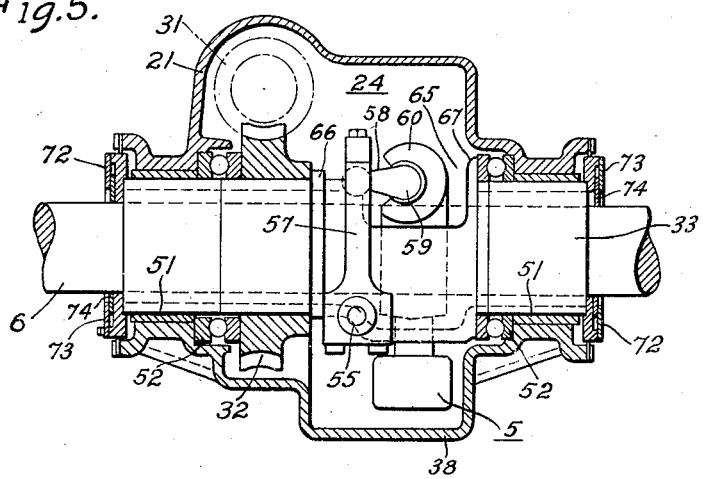
Fig. 5 is a view, partially in cross section and partially in end elevation of a modification of the quill shaft and link drive mechanism shown in Fig. 3.
Figure 6:
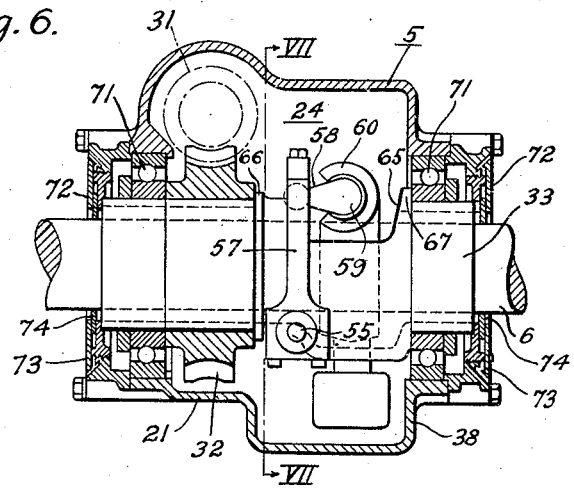
Fig. 6 is a view, partially in cross section and partially in end elevation of a further modification of the quill shaft and link drive mechanism.
Figure 7:
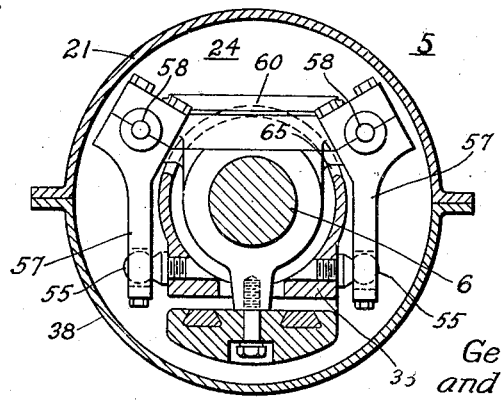
Fig. 7 is a view, partially in section and partially in elevation of the link mechanism for connecting the quill shaft to the wheel axle taken substantially along the line VII—VII in Fig. 6.

In order to provide a more compact disposition of the worm gear mechanism and the coupling 5 whereby the coupling also may be enclosed within the compartment 24, the modified constructions shown in Figs. 5, 6 and 7 may be utilized. In these modifications the collar member 60 which is secured to the axle 6 passes through a slot 65 in the quill shaft 33 on which the spherically ended driving pins 55 are mounted laterally. In this construction one side of the worm wheel 32 abuts against a shoulder 66 formed on the quill shaft 33 adjacent the coupling 5 and a second shoulder portion 67 is provided on the other side of the coupling 5 for engaging the thrust bearing 52.

In the construction shown in Figure 6, ball bearings 71 are utilized to replace the plane bearings 51 and the thrust bearings 52 shown in Figs. 3 and 5 for supporting the quill shaft 33 in the casing 21. In other respects, this construction is very much similar to the modification shown in Fig. 5.

In order to prevent the escape of oil or the entry of foreign matter where the axle 6 extends out of the casing 21, in the modified structures, seals 72 of any suitable type well known in the art may be provided at each end of the quill shaft 33.

In the constructions shown in Figs. 5 and 6 the quill shaft 33 carries at its ends a pair of ring members 73 between which a relatively thin annular plate 74 that is a tight fit on the axle 6 is disposed to slide. The packing members 64 for preventing the escape of oil at the ends of the quill shaft 33 are provided between the ring members 73 and the casing 21.

From the foregoing description and explanation, it will be apparent that the invention provides a vehicle drive mechanism that is light, compact and durable and that is so constructed that the entire weight of the motor, the quill shaft, the reduction gearing and the portion of the universal coupling means that is secured to the quill shaft is supported by the spring borne frame of the vehicle, and that the unsprung weight consists merely of the wheels, the axle, and that portion of the coupling which is secured to the axle.

Although several modifications of the invention have been set forth specifically, it will be obvious to those skilled in the art that various other modifications may be made in the design and arrangement of the various cooperating parts that comprise the vehicle drive mechanism without departing from the spirit and scope of the invention as defined in the appended claims.

We claim as our invention:

1. A railway vehicle drive comprising a wheel axle, a frame resiliently supported on the wheel axle, a motor for driving the wheel axle carried by the frame, a quill shaft disposed around the wheel axle and journalled in the frame, means for transmitting power from the motor to the quill shaft, a link mechanism for transmitting power from the quill to the wheel axle and a casing for enclosing the link mechanism, said casing being mounted on the quill shaft and disposed to rotate with it.

2. A drive mechanism for electrically driven vehicles comprising a motor structure, a motor spindle journalled in the motor structure, a hollow shaft carried by the motor structure, a worm and worm wheel gear for transmitting power from the motor spindle to the hollow shaft, a wheel axle disposed within the hollow shaft, universal coupling means for transmitting power from the hollow shaft to the wheel axle and a rotatable gear case carried by the hollow shaft for enclosing the coupling means.

3. A drive mechanism for electrically driven vehicles that comprises a motor structure having a partition disposed to divide the structure into two housing portions, a motor disposed within one of the housing portions and having a spindle extending into the other housing portion, said spindle being journalled in each end of the motor structure and in the partition, a hollow shaft journalled in the other housing portion, a worm wheel on the hollow shaft and a worm on the motor spindle for cooperating with the worm wheel to transmit power from the motor to the hollow shaft.

In testimony whereof, we have hereunto subscribed our names this thirteenth day of February, 1928.

GEORGE HERBERT FLETCHER.
ARNOLD TUSTIN.